(12) United States Patent
Emelianov et al.

(10) Patent No.: US 10,915,335 B1
(45) Date of Patent: *Feb. 9, 2021

(54) SYSTEM AND METHOD FOR INTERCEPTING DATA FLOW BETWEEN COMPUTER PROCESS AND SYSTEM RESOURCE

(71) Applicant: Virtuozzo International GmbH, Schaffhausen (CH)

(72) Inventors: Pavel Emelianov, Moscow (RU); Cyrill Gorcunov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,947

(22) Filed: Oct. 16, 2019

Related U.S. Application Data

(63) Continuation-in-part of application No. 15/393,879, filed on Dec. 29, 2016, now Pat. No. 10,452,408.

(51) Int. Cl.
| | | |
|---|---|---|
| *G06F 9/445* | (2018.01) | |
| *G06F 9/54* | (2006.01) | |
| *G06F 9/50* | (2006.01) | |
| *G06F 13/24* | (2006.01) | |

(52) U.S. Cl.
CPC .......... *G06F 9/44526* (2013.01); *G06F 9/50* (2013.01); *G06F 9/544* (2013.01); *G06F 13/24* (2013.01); *G06F 2209/542* (2013.01)

(58) Field of Classification Search
None
See application file for complete search history.

(56) References Cited

U.S. PATENT DOCUMENTS

| | | | |
|---|---|---|---|
| 5,884,033 A | 3/1999 | Duvall | |
| 10,089,461 B1 | 10/2018 | Ha | |
| 2004/0221294 A1 | 11/2004 | Kalmuk et al. | |
| 2005/0240906 A1 | 10/2005 | Kinderknecht et al. | |
| 2006/0156397 A1 | 7/2006 | Dai | |
| 2008/0189708 A1* | 8/2008 | Cheng | G06F 9/485 718/102 |
| 2010/0023995 A1* | 1/2010 | Kim | G06F 21/57 726/1 |
| 2012/0233612 A1* | 9/2012 | Beckett | G06F 9/45516 718/1 |
| 2015/0100791 A1* | 4/2015 | Chen | G06F 21/6218 713/189 |

(Continued)

*Primary Examiner* — Umut Onat
(74) *Attorney, Agent, or Firm* — Bardmesser Law Group

(57) ABSTRACT

System for redirecting input/output, which performs, on a CPU, interrupting an execution of a first process with a first object descriptor table associated with the first process, the first object descriptor table including a reference for the first process to a first system resource; loading parasite code into memory, wherein the parasite code provides access to a second system resource under control of a second process; the second process forcing a switch of execution from the first process to the parasite code, and replacing in the first object descriptor table the reference for the first process to the system resource by a reference to the second system resource, thereby causing the input/output to go through the second system resource instead of the first system resource; and restoring the execution of the first process after the execution of the parasite code is complete.

34 Claims, 10 Drawing Sheets

(56) References Cited

U.S. PATENT DOCUMENTS

| | | | |
|---|---|---|---|
| 2015/0142748 A1* | 5/2015 | Gottemukkula | G06F 11/1451 707/649 |
| 2015/0156250 A1* | 6/2015 | Varshney | G06F 9/455 709/201 |
| 2017/0104641 A1* | 4/2017 | Bradshaw | H04L 43/045 |

* cited by examiner

SYSTEM AND METHOD FOR INTERCEPTING DATA FLOW BETWEEN COMPUTER PROCESS AND SYSTEM RESOURCE

CROSS REFERENCE TO RELATED APPLICATIONS

This application is a continuation in part of U.S. patent application Ser. No. 15/393,879, filed on Dec. 29, 2016, which is incorporated herein by reference in its entirety.

TECHNICAL FIELD

The present disclosure generally relates to the field of computer processing, and, more particularly, to a system and method for controlling and intercepting data traffic between a computer process and a file.

BACKGROUND

Typically, when a computer program is written and compiled, there is no way to add functionality to the program without having to recompile the code. However, there are some techniques that enable a piece of software code to be added to the process of the executing program. For example, COMPEL is a software utility provided to execute arbitrary code in a context of a foreign process. COMPEL is part of CRIU ("Checkpoint/Restore In Userspace"), which is a software tool for the LINUX operating system provided to implement checkpoint/restore functionality for LINUX. Using COMPEL, a user creates a parasite code, compiles the code, and links the code using the COMPEL utility. Once compiled with COMPEL flags and linked, the parasite code can be executed in another process's context with the help of COMPEL library.

FIG. 1 illustrates a high-level flow diagram for execution and working with files of a conventional computer process. As shown, a process or task 10 that is executed by a computer processing unit of a computer accesses a file descriptor table 11 of the operating system of the computer to read data from and write data to a File "X", denoted by reference 12. When the task 10 is to perform a read or write operation to the File X, the task 10 uses a system call and the descriptor (e.g., descriptor number 4), which provides a reference or indicator to the File X, is used as an argument. In other words, for any I/O system call that operates on a file such as File X, the first argument for the system call is a file descriptor. Thus, in this instance, the process makes a system call for the 4th file descriptor in the file descriptor table 11 to write and read data to and from File X.

In this context, the COMPEL utility is able to add parasite code to the task 10 that can be executed in that process's context so that when it is executing its own code, the task 10 interrupts, executes the loaded code (i.e., the parasite code), and then continues to run the original compiled program code. COMPEL works by connecting to the process 10 using a debugging program interface of the operating system and stopping the process 10 as if it is interrupted at the breakpoint. For example, in LINUX, there is a debugging program interface that allows another process to connect to the process 10, and to read from and write to the memory of the process 10. In the process address space, COMPEL identifies a white space and writes the binary code (i.e., the parasite code) so that it is loaded into the process. Accordingly, using the debugging program interface, COMPEL changes the registers of the process 10 containing the next instruction (i.e., the "RIP") to the entry point of the loaded binary code. Then, it gives the command to proceed execution of the process.

With the COMPEL utility, the binary code (i.e., the parasite code) is compiled in a way that when its execution comes to an end, it signals its stop point to the debugging programming interface. COMPEL intercepts that signal, unloads the binary code, and changes the process registers to the values that they had at the breakpoint, such that the process 10 proceeds to full execution. As a result, COMPEL facilitates the execution of a code fragment with the execution of process 10 without appearing to do so.

Although applications like the COMPEL utility enable code to be added to a compiled process (e.g., task 10), there is currently no ability to modify existing processes that perform operations for system resources after being compiled. For example, while the COMPEL utility can add code, it cannot modify an existing read and/or write operation from task 10 to File X. In other words, existing systems cannot access or modify the communication channel between task 10 and File X via file descriptor table 11. Accordingly, a more flexible approach is needed for easily modifying a complied computer program.

SUMMARY OF THE INVENTION

Thus, the present disclosure provides for a system and method for controlling and intercepting input/output between a computer process and a file or other system resource without requiring the restarting and/or recompiling of the connected processes. In one aspect, an exemplary method includes interrupting an execution of a first process by a CPU of a computing device having an operating system with a first file descriptor table associated with the first process, the first file descriptor table including an index reference for the first process to a system resource; loading parasite code into an address space of the first process; providing a communication channel between the first process and a second process; updating a second file descriptor table for the second process so that the second file descriptor table includes a first index reference to the system resource and a second index reference to the communication channel; updating the index reference in the first file descriptor table to reference the communication channel; and restarting the execution of the first process by the CPU of the computing device.

In another aspect, the method further includes transferring, by the parasite code, the system resource to the second process using the communication channel.

In another aspect, the method further includes providing the communication channel as a socket to transfer the system resource to the second process; creating a pipe between the first process and a second process to be used during execution of the first process; updating the index reference in the first file descriptor table to reference the pipe; and removing the socket after creating the pipe and transferring the system resource to the second process.

In another aspect, upon the restoring of the execution of the first process, the method further includes performing a data processing action, by the second process, on data communicated between the first process and the system resource.

In another aspect, the performing of the data processing action comprises at least one of encrypting and decrypting the data, packing and unpacking the data, and multiplexing the data.

In another aspect, the system resource is one of a disk file, a pipe, a device, a socket, and a terminal device.

In another aspect, the performing of the data processing action includes identifying at least one keyword associated with at least a portion of the data communicated between the first process and the system resource, and performing the data processing action on the portion of the data associated with the at least one keyword.

In another aspect, the interrupting of the execution of the first process comprises interrupting the execution of the first process using a COMPEL library.

In one further aspect a system is provided for controlling and intercepting input/output between a computer process and a file or other system resource. In this aspect, the system includes electronic memory; and a processor configured to interrupt an execution of a first process by a CPU of a computing device having an operating system with a first file descriptor table associated with the first process, the first file descriptor table including an index reference for the first process to a system resource, load parasite code into an address space of the first process, establish a communication channel between the first process and a second process, access from the electronic memory and update a second file descriptor table for the second process so that the second file descriptor table includes a first index reference to the system resource and a second index reference to the communication channel, update the index reference in the first file descriptor table to reference the communication channel, and cause the restoring of the execution of the first process by the CPU of the computing device.

In another aspect, a non-transitory computer readable medium is provided that includes computer executable instructions for controlling and intercepting input/output between a computer process and a file or other system resource. In this aspect, instructions are provided for interrupting an execution of a first process by a CPU of a computing device having an operating system with a first file descriptor table associated with the first process, the first file descriptor table including an index reference for the first process to a system resource; loading parasite code into an address space of the first process; providing a communication channel between the first process and a second process; updating a second file descriptor table for the second process so that the second file descriptor table includes a first index reference to the system resource and a second index reference to the communication channel; updating the index reference in the first file descriptor table to reference the communication channel; and restoring the execution of the first process by the CPU of the computing device.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION OF EMBODIMENTS OF THE INVENTION

Figure 1:
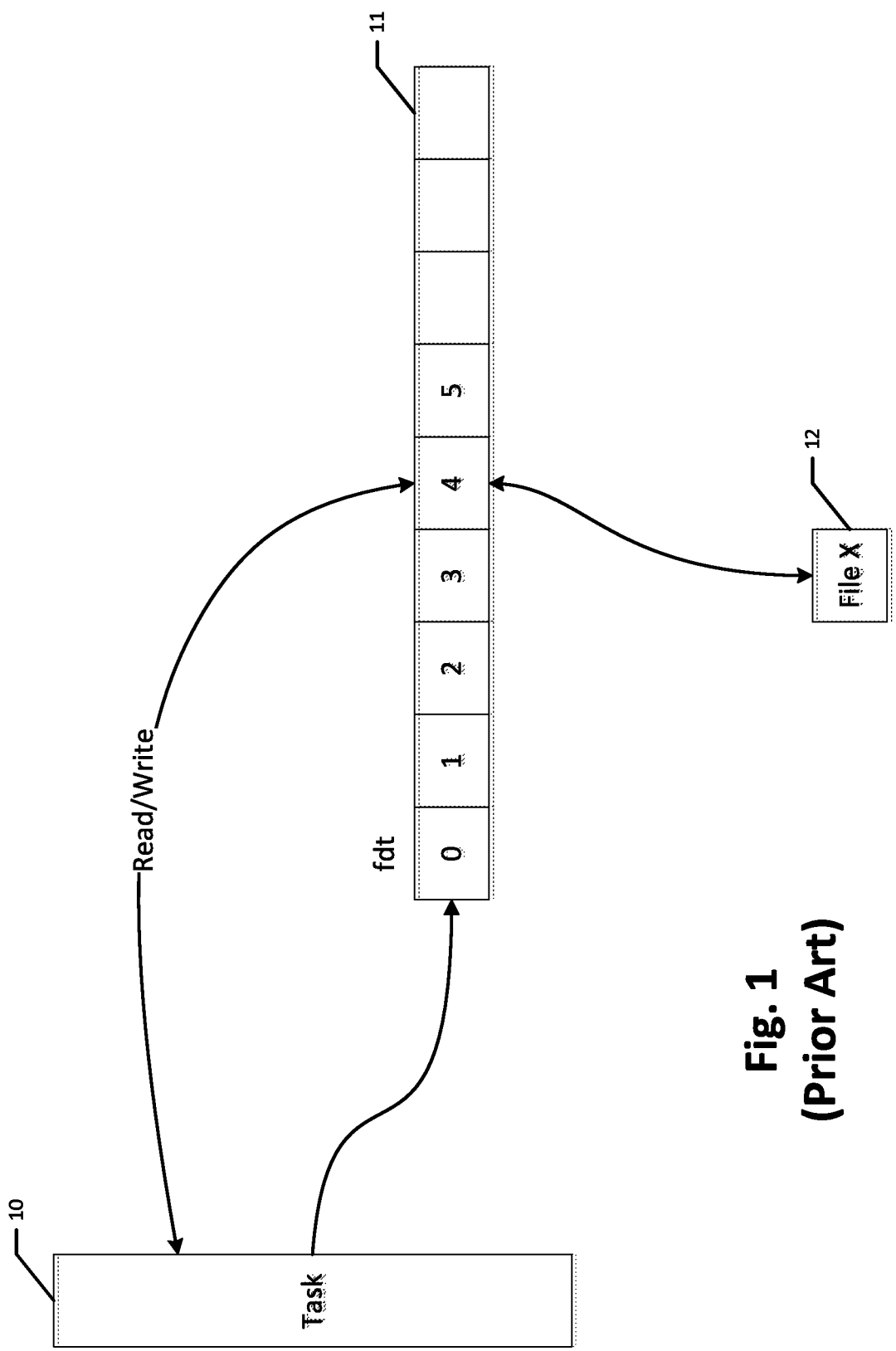
FIG. 1 illustrates a high-level flow diagram for execution and working with files of a conventional computer process.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

Figure 2:
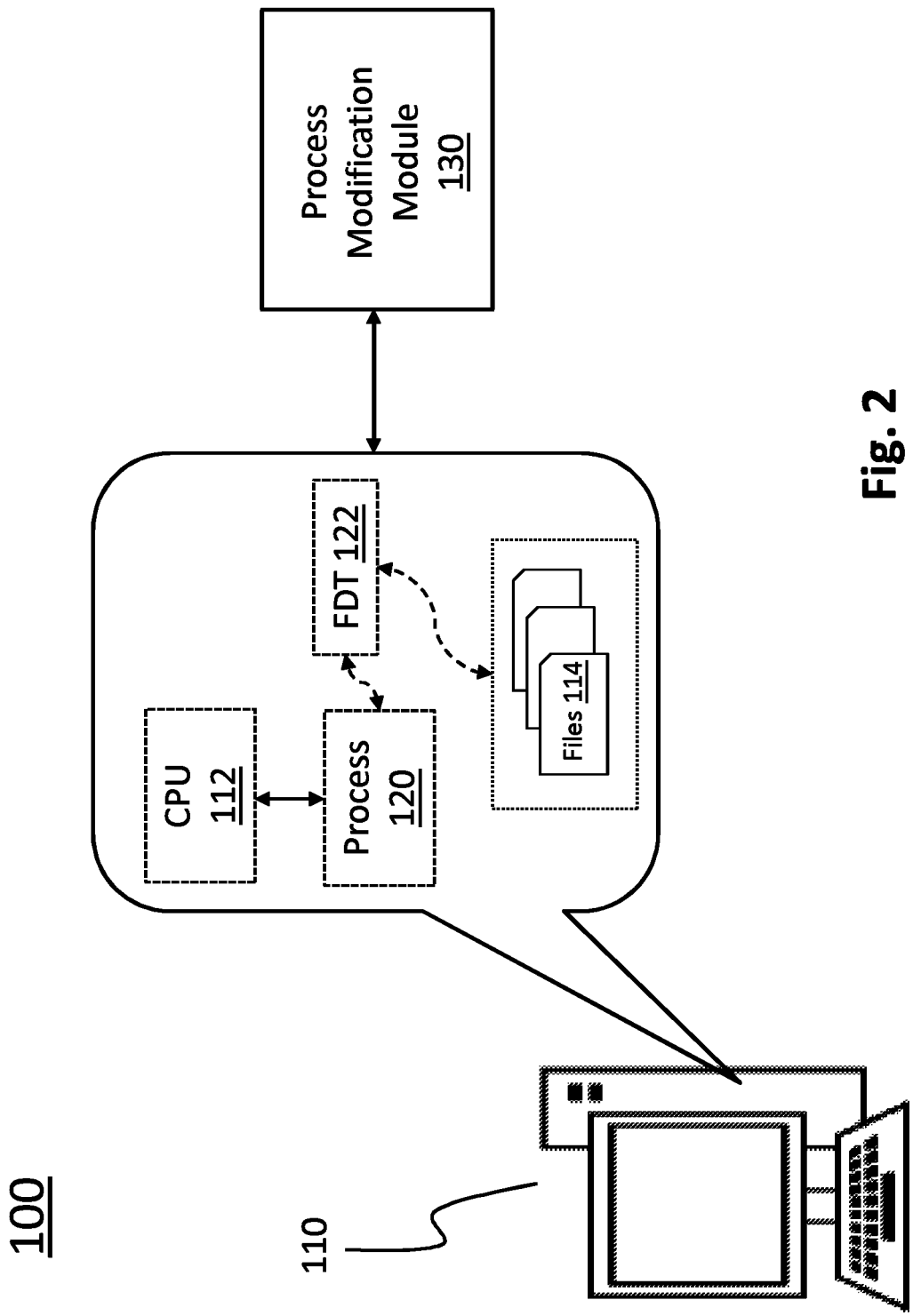
FIG. 2 illustrates a high-level block diagram of a system for intercepting and controlling data traffic between a computer process and a file according to an exemplary aspect.

FIG. 2 illustrates a high-level block diagram of a system for intercepting and controlling data traffic between a computer process and a file or other system resource according to an exemplary aspect. As shown, system 100 includes a computing device 110 (e.g., a client device) that executes many processes during operation as should generally be understood to one skilled in the art. More particularly, the computing device 110 includes a central processing unit ("CPU") 112 that is configured to execute one or more processes 120. In general, a process can broadly be considered an instance of a computer program that is being executed within an operating system. Thus, a computer program is a passive collection of instructions, while the process is the actual execution of the computer program instructions inside a special environment created for it by an operating system by the CPU 112. Each process 120 therefore contains the program code and its current activity.

Although not shown in detail, the computer device 110 includes electronic memory that stores the executable code that is executed by the CPU 112, process-specific data (input and output), a call stack that tracks active subroutines, etc., and a heap to hold intermediate computation data generated during run time. Moreover, the computer device 110 includes an operating system that includes descriptors of resources (e.g., files 114) that are allocated to each process 120. For example, the operating system of the computer device 110 (i.e., the operating system kernel) includes one or more file descriptor tables ("FDTs") 122 that provide a reference or indicator to each process 120 during execution to access a file 114 or other input/output resources, such as a pipe or network socket. In one aspect, each file descriptor table forms part of the POSIX ("the Portable Operating System Interface") application programming interface for the computer device 110. Moreover, it should be appreciated that each file descriptor in each table is a non-negative integer, generally represented in the C programming language as the type "int". The details of the file descriptor table 122 will be described in more detail below.

It should be appreciated that the exemplary aspect is described as operating in a computing environment using a LINUX operating system. In an alternative aspect, the system and method can be implemented on a MICROSOFT WINDOWS operating system. In this case, index references for system resources are called "file handles" (instead of file descriptors), and the table including index references for system resources (i.e., similar to file descriptor tables 122 and 136 described herein) is called "file handle table" (instead of file descriptor table). Otherwise, the method and algorithm of functioning of the system as described herein is the same for either a LINUX or MICROSOFT WINDOWS operating system. Moreover, a communication channel can be either a pipe or a socket. Preferably, pipes are used when task 120 and proxy task 132 are running on the same machine (physical or virtual), and sockets are preferably used when these two tasks are running on the different machines. It should be appreciated that for purposes of this disclosure, the terms "file descriptor" and "file handle" can be used interchangeable and likewise the terms "file descriptor table" and "file handle table" can be used interchangeably.

During operation, the CPU 112 executes process 120, which in turn uses file descriptor table 122 to access one or more system resources, such as files 114. According to the exemplary aspect, process modification module 130 is configured to access and modify process 120 to perform some type of desired data processing action (e.g., encryption and decryption) of data written to and read from files 114. Although the details of process modification module 130 will be described below, process modification module 130 includes a plurality of sub-modules configured to perform the algorithms disclosed herein. Each of these sub-modules can be considered a single module or separate software modules, with the modules each including software code (e.g., processor executable instructions) in the memory of the computer device 110, which may be configured to execute/facilitate the control and modifying of process 120 according to an exemplary embodiment. Moreover, process modification module 130 is shown as a separate component from computer device 110 in the exemplary and can be executed on a separate computing device (e.g., a system server) that is communicatively coupled to computer device 110 over a network (e.g., as part of the Internet or intranet using various communications infrastructure such as Ethernet, WiFi and the like), for example. In another aspect, process modification module 130 can be a software module that is installed on computer device 110 and executed by CPU 112.

Moreover, as used herein, the term "module" can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 3:
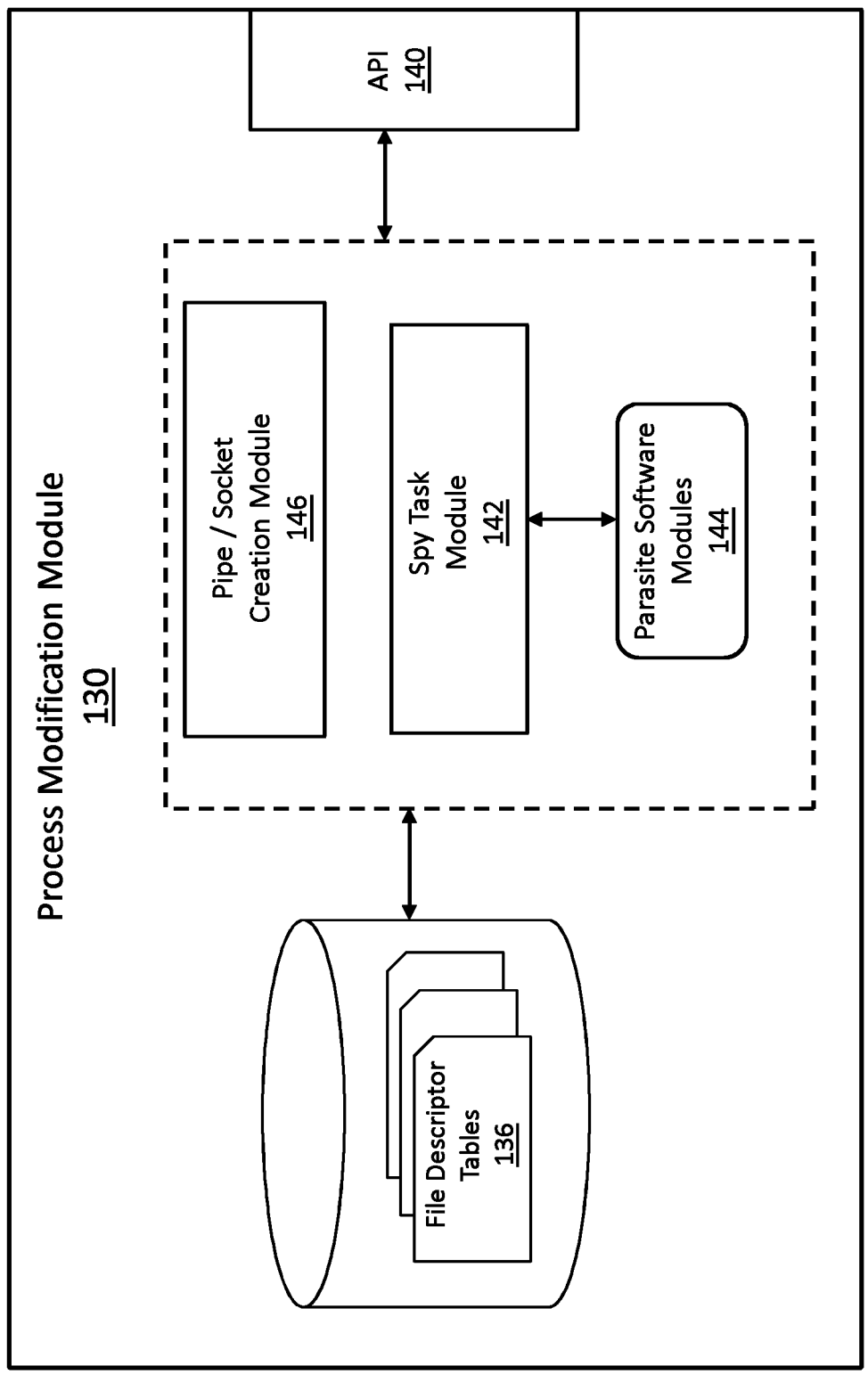
FIG. 3 illustrates a detailed block diagram of the process modification module 130 illustrated in FIG. 2 according to an exemplary aspect.

FIG. 3 illustrates a detailed block diagram of the process modification module 130 illustrated in FIG. 2 according to an exemplary aspect. As shown, process modification module 130 uses an application programming interface ("API") 140, which is a debugging interface configured to access process 120 provided by the operating system executed by computer device 110. Moreover, a spy task module 142 is provided to generate and/or provide parasite software modules 144 that can be loaded in the address space of the target process 120 via API 140. In general, the parasite software module 144 is loaded in process 120 and is used to interact with process 120 to get the process 120 to perform desired operations relating to access of files 114. In the exemplary aspect, the parasite software modules 144 can be considered a security exploit in that spy task module 142 implementing the parasite software modules 144 has no authority to consume resources (e.g., files 114) that are otherwise available to the process 120.

As will be described in detail below, once the parasite software module 144 is loaded to the address space of the process 120, the process modification module 130 is able to create and/or modify the routing of operations between process 120, file descriptor table 122 and files 114. In this regard, the process modification module 130 further includes a pipe/socket creation module 146 that is configured to generate and provide a pipe and/or socket (generally referred to as a communication channel) between file descriptor table 122 of the victim task on the computer device 110 and the file descriptor table 136 of the process modification module 130. The file descriptor table 136 functions in the same manner as file descriptor table 122 (described above) by providing an index between processes and resources (i.e., an index of file descriptor of the resource in the process file descriptor table).

It should be appreciated that while the exemplary aspect mainly describes managing data traffic between a process and a file, the system and method described herein can be implemented for managing data flow between a process and other types of system resources. Thus, in one aspect, not only file inputs/outputs can be intercepted and processed, but the system and method can also intercept and process inputs/outputs to other system resources, such as memory mappings, for example. In this case, the proxy/spy task can implement techniques to monitor the data used by the original task in an effective and invisible to the latter task manner.

Thus, according to the exemplary aspect, the pipe/socket creation module 146 is configured to create a UNIX domain socket (i.e., an inter-process communication (IPC) socket) that is a data communication endpoint for exchanging data between processes (e.g., process 120) and a spy task executing on the same host operating system (e.g., computer device 110). Furthermore, the pipe/socket creation module 146 is configured to generate a pipe or socket or any other communication channel, which can be used by parasite module and the spy task (process modification module). Generally, pipes are unidirectional for communication, but may have a return channel or backchannel. According to the exemplary aspect, the pipes can be implemented in memory of the single computer device 110 where both processes (i.e., process 120 and spy task) are executed. Moreover, sockets are much more flexible because they provide communication between processes on different hosts. For example, a socket will be used if the spy task is executed on a different host device than the process 120 according to one exemplary aspect.

Figure 4A:
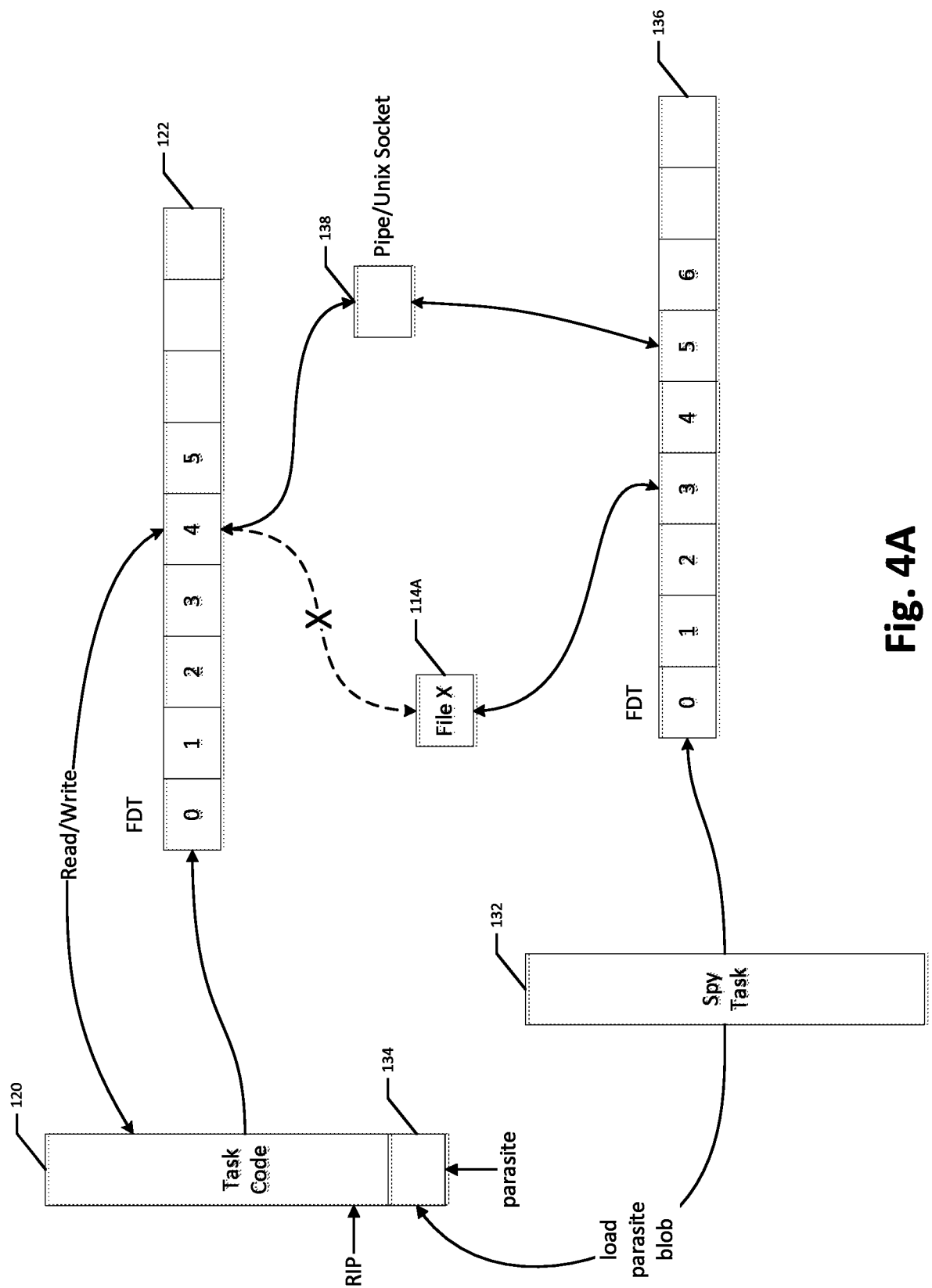
FIG. 4A illustrates a high-level flow diagram for a method for intercepting and controlling data traffic between a computer process and a file according to an exemplary aspect.

FIG. 4A illustrates a high-level flow diagram for a method for intercepting and controlling data traffic between a computer process and a file or other system resource according to an exemplary aspect. As shown, a task code 120 (corresponding to process 120 described above) is configured to perform a number of operations that include the accessing the system resources (e.g., read and write to "File X" 114A) using file descriptor table 122. It should be appreciated that "File X", as the term is used herein, is not only limited to a conventional computer file as a resource for storing information. Rather, in LINUX terminology, File X can be considered an abstract file, that be, for example, a disk file, a pipe, a device, a socket, a terminal or the like.

Moreover, according to the exemplary aspect, the file descriptor table 122 provides an index in a table so that each file (or other resource) can be accessed by task code 120 using this index. FIG. 4D illustrates a functional diagram of an exemplary file descriptor table 122 according to another exemplary aspect. As shown, each index number in the file descriptor table 122 indicates a corresponding system resource (e.g., a file, but can also be a pipe, socket, etc.) for which the task code 120 can access during execution. In this example, index number "0" corresponds to a "File A", index number "1" corresponds to a "File B", and index number "2" corresponds to a "File C". Thus, when task code 120 accesses one of these index numbers in the file descriptor table 122 (in response to a write operation, for example), the task code 120 in turn is directed to the location and access of the corresponding file (or other system resource) by calling a special system call for the corresponding file descriptor.

In any event, referring back to FIG. 4A, as shown, the process modification module 130 is configured to eliminate direct reference from file descriptor table 122 to File X (referenced by index number 4 in file descriptor table 122) and instead reroute this communication path through a pipe or UNIX socket 138 that connects file descriptor table 136 corresponding to the process modification module 130.

In particular, while process 120 is initially executing its normal code, the process modification module 130 is configured to interrupt this process using debugging API 140 and load its own code (i.e., parasite software module 144) into the address space of task 120. For example, the spy task 132, which uses spy task module 142, interrupts the process and loads a parasite blob (i.e., a parasite software module 144 that can be a binary blob) to the first process (i.e., task code 120) using the COMPEL utility (i.e., a COMPEL library) described above, for example, and passes control to the parasite blob by placing an instruction pointer (i.e., an RIP) from next instruction in first process 120 to the entry point of the parasite blob (i.e., a parasite software module 144).

During execution, the parasite software module 144 then connects to spy task 132 with UNIX socket 138 and sends the File X 114A to the spy task 132 via the socket 138. Specifically, the parasite software module 144 is configured to receive the File X 114A from the parasite code 134 and provide access to the File X 114A via the file descriptor table 136. As further shown, the file descriptor for File X 114A then appears in the spy task file descriptor table 136, at index 3, for example.

Once the file descriptor for File X 114A is added to file descriptor table 136, the pipe/socket creation module 146 is further configured to create a data communication channel between the two processes, i.e., task 120 and spy task 132. As shown, in the exemplary aspect, the pipe/socket creation module 146 creates a pipe or UNIX socket 138 and writes its descriptor to the file descriptor table 122 of the task 120, and, specifically, to the index (e.g., index number 4) that previously contained the file descriptor for File X 114A (i.e., index number 4). As a result, index number 4 of the file descriptor table 122 now references pipe or UNIX socket 138, which in turn is a communication channel to spy task 132 (so that the file descriptor of the communication channel appears in the file descriptor channel 136 of spy task). The communication channel can be a pipe or a socket, so in LINUX, the communication channel is a type of file and has file descriptor. As further shown, the spy task module 142 is configured to update file descriptor table 136 to include a descriptor to File X 114A. This is shown as index number 3 of file descriptor table 136. As a result, at this point, the direct reference between file descriptor table 122 and File X 114A has been removed as indicated by the "X" through this arrowed connection. After the reference to File X 114A by task code 120 has been rerouted through spy task 132, the parasite software module 144 exits (i.e., stops) and is unloaded (i.e., deleted or removed) from task code 120.

According to one exemplary aspect, the parasite software module 144 is written in C, since COMPEL supports only C. In this aspect, the parasite software module 144 is first compiled and then COMPEL makes linking with a specific additional code that turns the compiled program into a parasite blob. As noted above the parasite blob can then be loaded in the address space of task code 120, given control and signaled its stop point.

Figure 4B:
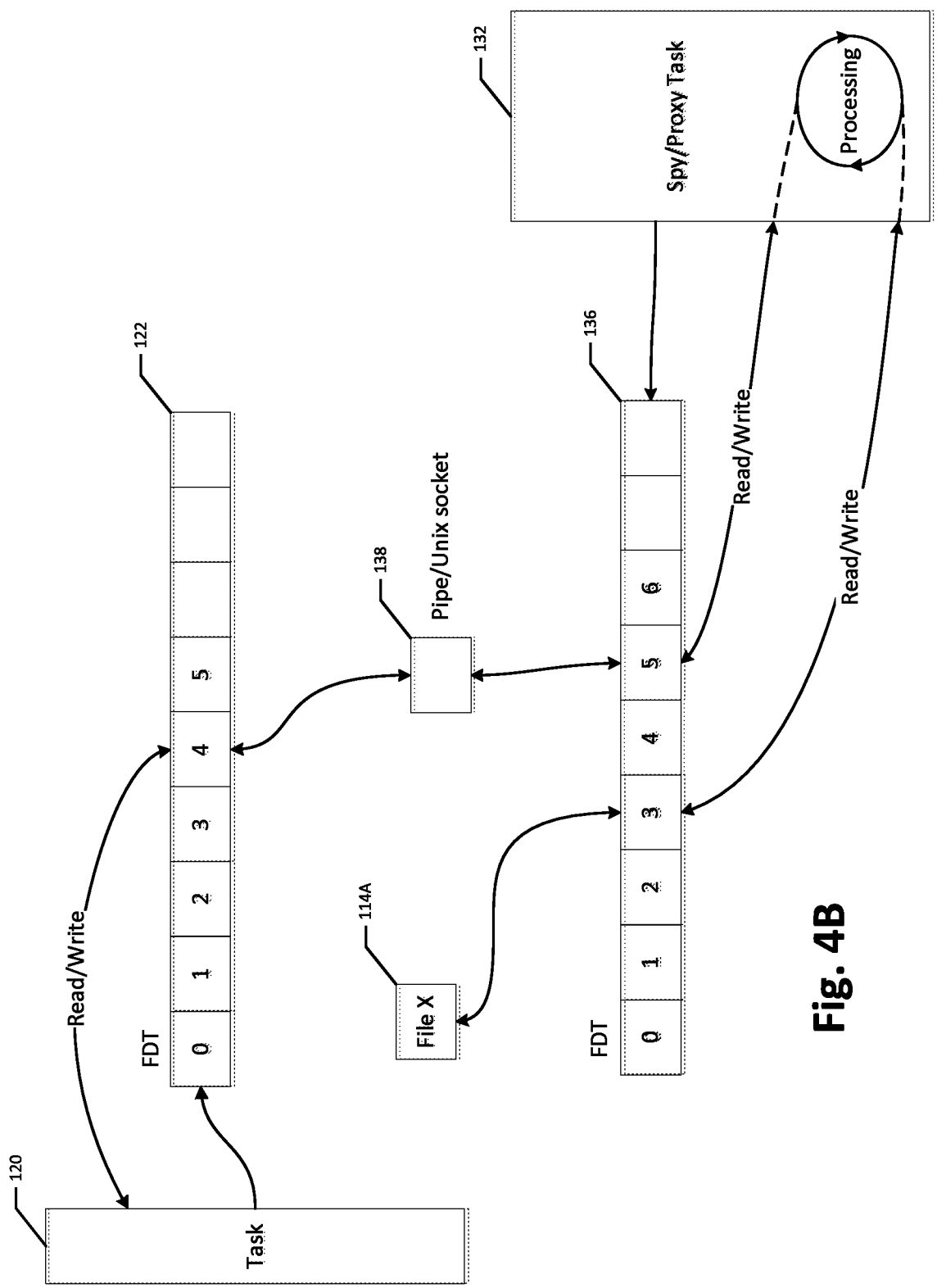
FIG. 4B illustrates a high-level flow diagram of the process flow after modifying the computer process as shown in FIG. 4A.

FIG. 4B illustrates a high-level flow diagram of the process flow after modifying the computer processes as shown in FIG. 4A. As shown, during execution of task 120 by CPU 112, the task 120 references file descriptor table 122 to access each system resource (e.g., read or write operations) during execution. As shown, when a specific operation (e.g., read or write operation) of task 120 references descriptor number 4 of file descriptor table 122 (which previous referenced File X 114A directly), the descriptor number 4 now references a communication channel, i.e., pipe or UNIX socket 138. The communication channel 138 is referenced by spy task, and, specifically, descriptor number 5 of file descriptor table 136. In other words, the communication channel 138 is between process 120 and spy task 132. This reference is to spy/proxy task 132, which is configured to process the incoming/outgoing data traffic to and from File X. As generally shown, these operations can be read and/or write operations and spy/proxy task 132 can perform an operation on such data. For example, in one aspect spy/proxy task 132 is configured to perform a data encryption and decryption of data being written to and read from File X 114A. As further shown, the File X 114A is referenced in file descriptor table 136 at reference number 3, for example. It should be appreciated that after the algorithm is performed as described above with respect to FIG. 4A, the spy/proxy task 132 is able to control all data generated by the first task 120 and transmitted and from to the File X 114A. Therefore, the spy/proxy task 132 can analyze, change and perform any actions to the data, such as encryption and decryption, for example.

Figure 4C:
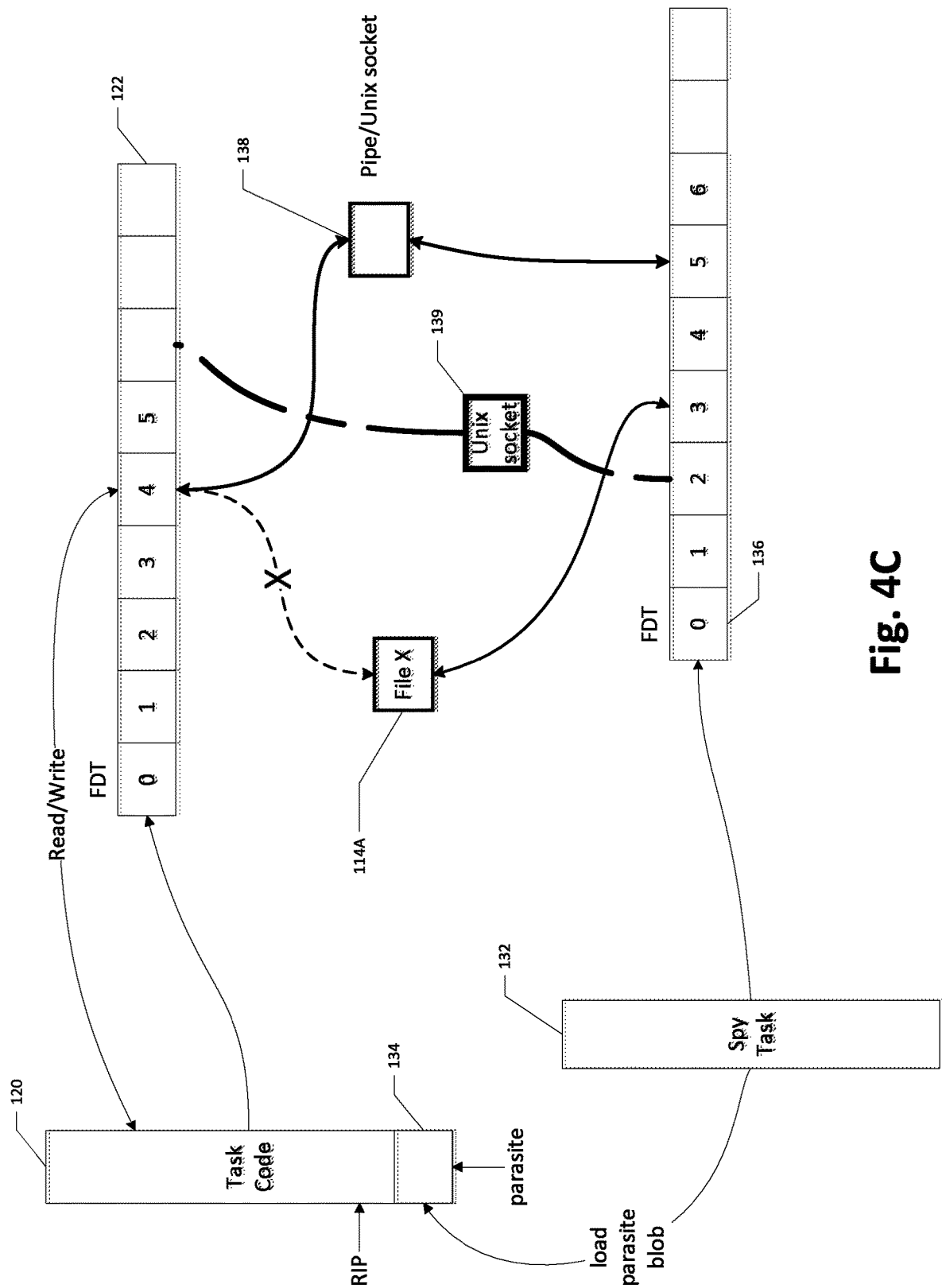
FIG. 4C illustrates a high-level flow diagram for a method for intercepting and controlling data traffic between a computer process and a file according to another exemplary aspect.
Figure 4D:
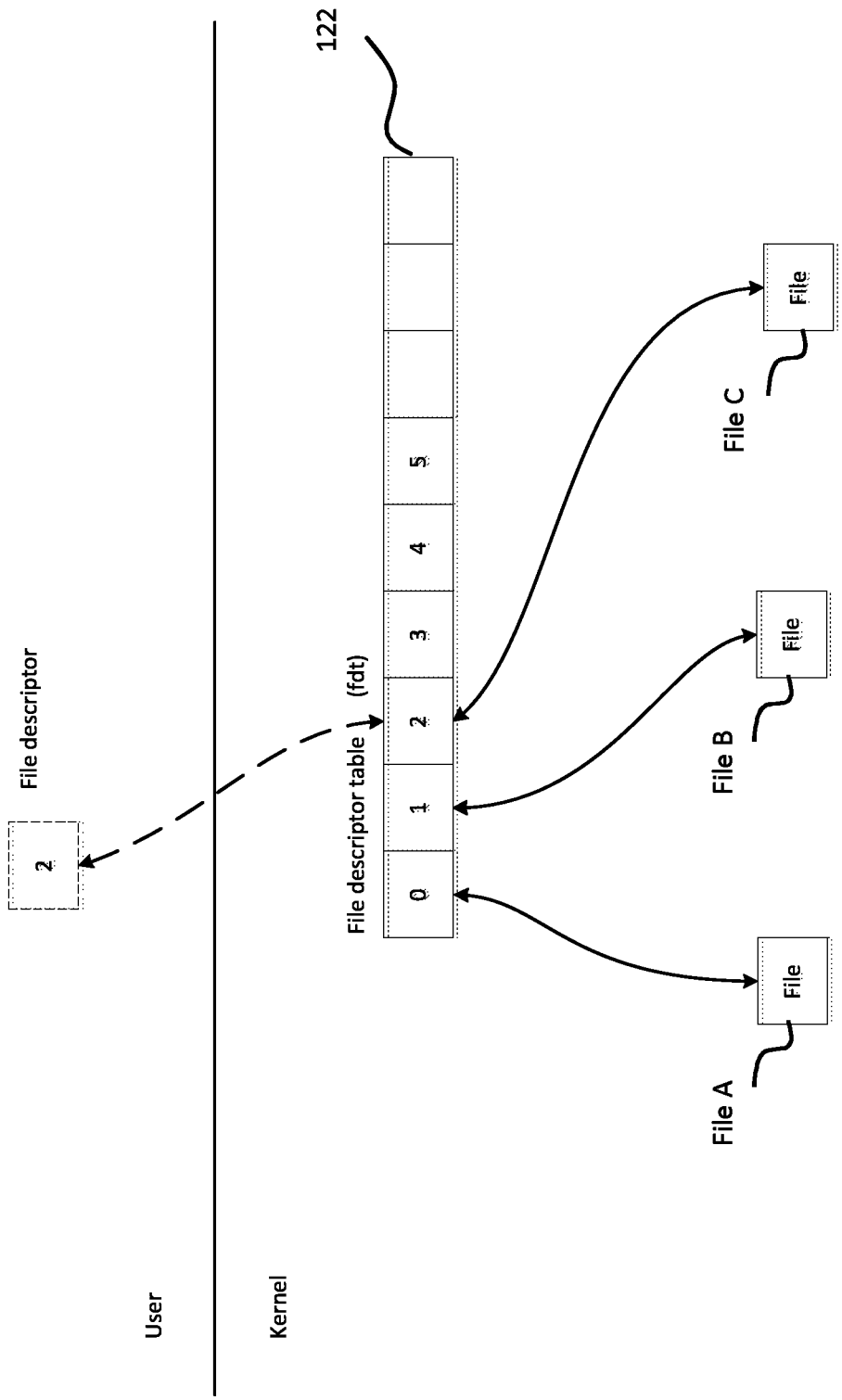
FIG. 4D illustrates a functional diagram of an exemplary file descriptor table according to another exemplary aspect.

FIG. 4C illustrates a high-level flow diagram for a method for intercepting and controlling data traffic between a computer process and a file or other system resource according to another exemplary aspect. As shown, most of the components provided herein are the same components implemented in the method described above with respect to FIG. 4A. The details and function of such components will not be repeated herein. The main refinement shown is that when the parasite blob takes control of task code 120, a UNIX socket 139 is set up between task 120 and spy/proxy task 132 to transfer access of File X 114A from task code 120 to spy task 132. The descriptors of this socket appear in file descriptor table 122 and file descriptor table 136. Next, a pipe 138 may be established between descriptor table 122 and file descriptor table 136 as described above. Once the indices of both descriptor table 122 and file descriptor table 136 are updated, the UNIX socket 139 is destroyed and removed from the data flow of the resulting system and processes. In this instance, the same data flow shown in FIG. 4B will result from this method. In an alternative aspect, if a socket is required for communication between descriptor table 122 and file descriptor table 136 (i.e., between process 120 and spy task 132), for example, if these two tasks are in separate operating systems (and so these tables are parts of separate operating systems) of separate systems, then UNIX socket 139 will not be destroyed. Rather, this UNIX socket 139 will replace the functionality of the pipe 138 described above. Advantageously, this step minimizes processing steps to optimize the algorithm and reduce consumption of computing resources, including processing resources and memory.

In either event, referring back to the flow diagram shown in FIG. 4B, it should be appreciated that spy/proxy task 132 is a software process that now controls and manages the operations of the data traffic to and from File X 114A. As described above, execution of the task 120 by CPU 112 includes referring to file descriptor table 122, which in turn indirectly accesses File X 114A. The exemplary system and method utilizes the process modification module 130 to change the common scheme into another new scheme with spy/proxy task 132 (which is a new software process or module) with its own file descriptor table 136 to control access to File X 114A. Therefore, in a write operation performed by task 120, for example, data that previously would be transmitted directly into a File X 114A, now goes into the pipe or socket 138 and then into the spy/proxy task 132, which executes the operation, e.g., being read and processed (e.g., traffic analyzing, packing/unpacking, encrypting/decrypting, multiplexing) by the process 132 before finally be input to File X 114A. In other words, data will be written to File X 114A, but only after it is processed by spy/proxy task 132 (i.e., an interagent).

According to this exemplary aspect, a read operation works according to a similar algorithm. For example, when task 120 requests a read operation from File X 114A, the spy task 132 will execute a system call for the descriptor (e.g., descriptor number 3 in file descriptor table 136) corresponding to the File X 114A. Then, the spy task 132 will pass data to the task 120 using pipe or UNIX socket 138. In turn, the task 120 will read the data from the pipe/UNIX socket 138.

According to the exemplary aspect, the process modification module 130 is configured to replace the opened file of the process (i.e., the indicator between file descriptor table 122 and File X 114A) with pipe or UNIX socket 138. In LINUX it is possible to transmit opened files between processes using a UNIX domain socket. Moreover, the File X 114A is transferred to the caller process, which is the spy/proxy task 132. Furthermore, it should be appreciated that while spy and proxy tasks are shown as a single component in the exemplary aspect, these two functions can be separate software modules in an alternative aspect.

The exemplary system and method can use the tunneling technique to modify various files and employ multiple types of processing on the data traffic. For example, in one aspect, the first process (i.e., task 120) may have a socket as File X. In this aspect, the socket may be considered a file, so it is possible to implement the scheme described above. Using COMPEL, the system is configured to load the binary file (i.e., the parasite blob) to the first process 120. The parasite blob then replaces the original socket with a new socket (e.g., pipe/socket 138), which belongs to the second process (i.e., spy task 132). As a result, the spy task 132 can intercept the data traffic that the first process 120 transmits through sockets, and perform a desired processing on the data traffic (e.g., analyze, pack, and the like).

Although in no way limited, the spy/proxy task 132 is configured to perform different types of processing on the data traffic written to and read from File X 114A. For example, in one aspect, the proxy task 132 is configured to inject a socket spy that is configured to analyze the data traffic. In this exemplary aspect, the second process is configured to reads all the data traffic generated by the first process 120, analyze it and identify key words. After any key word is identified, the second process 132 is configured to perform some actions corresponding to the key word. In one aspect, the key words can be user defined for the interception process. For example, the spy/proxy task 132 lists all sockets a process uses and asks the intercepting code to identify the proxy/tunnel that would allow spy task to analyze the data traffic to identify all data including the key words from a predefined list. Thus, if the first process 120 is an http server, for example, and the data flow is http traffic, then keywords may be those matching particular http header parameters or tags or the like, for example. In this regard, the processing by spy task 132 can be to fix URLs on a given pages, redirect a user to another page, fix bad encodings, and the like.

In a related aspect, the second process 132 is configured to pack and unpack data traffic. In this aspect, the second process 132 is configured pack the data traffic generated by the first process and unpack received data traffic. For example, there can be considered two processes that communicate data using sockets. Moreover, the processes can be located on different computers and connected via the Internet. Moreover, the processes may be configured to send and receive huge amounts of data. In this exemplary aspect, the spy/proxy process 132 is configured to pack and unpack the data as it is transmitted to and from the processes to facilitate the transmission of this large amount of data. Moreover, it should be appreciated that there will be an analogous proxy process on the second computer.

In another aspect, the spy/proxy process 132 is configured to encrypt and decrypt data that is transmitted to and written from File X 114A. Specifically, the spy process 132 is configured to encrypt the data traffic generated by the first process 120 and decrypt received data traffic, using known data encryption techniques (e.g., RSA public-key encryption, AES, and the like). For example, the aspect can prove useful for two processes that are connected by unsecure channel. In such cases, it is reasonable to put two decrypting processes between them that encrypt data before sending it to the channel and decrypt received data. Using the disclosed system and method, it is possible to implement encryption to an unsecure channel without restarting or recompiling the connected processes (e.g. process 120).

In yet another aspect, the second process 132 can be configured to facilitate traffic fanout (i.e., multiplex) of the data traffic. For example, in an exemplary aspect, the first process 120 uses sockets for network communication. Using the above described algorithm, the second process 132 can take away all the sockets of the first process 120 and then analyze the data traffic transmitted to and received from the first process 120. Moreover, the second process 132 can then send some of the data traffic (e.g., the messages) to a third process that can handle messages instead of the first process 120 (assuming it is allowed to by the protocol). As a result, the disclosed system and method is configured to remove the exclusive usage of the network channel from the first process 120 and to add at least one other process (i.e., the third process) that can handle such messages.

Figure 5A:
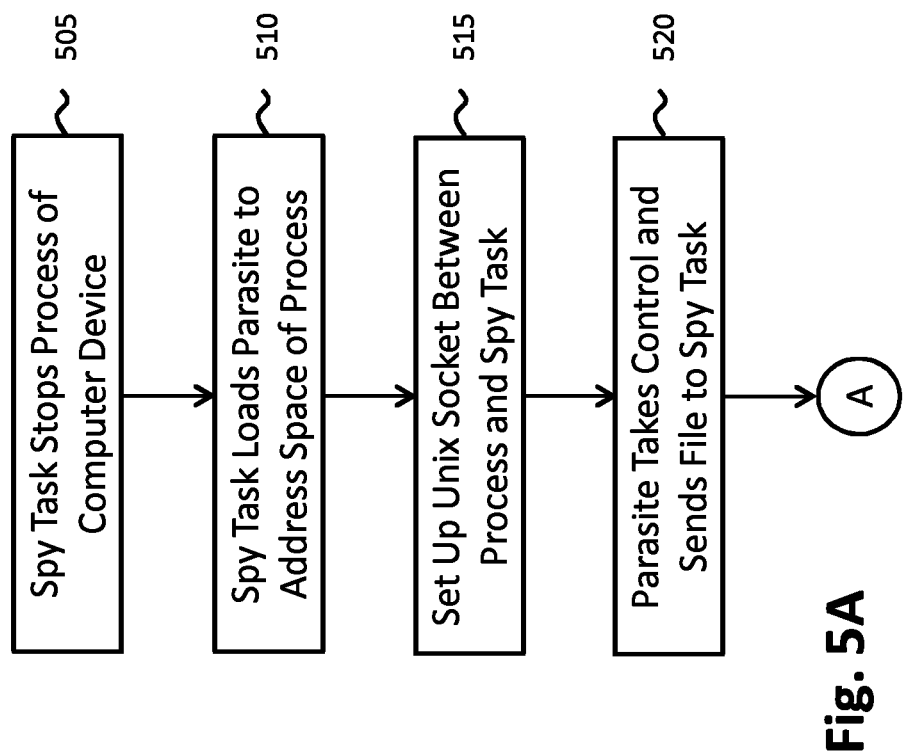
FIGS. 5A-5B illustrates a flowchart for a method for intercepting and controlling data traffic between a computer process and a file according to an exemplary aspect.
Figure 5B:
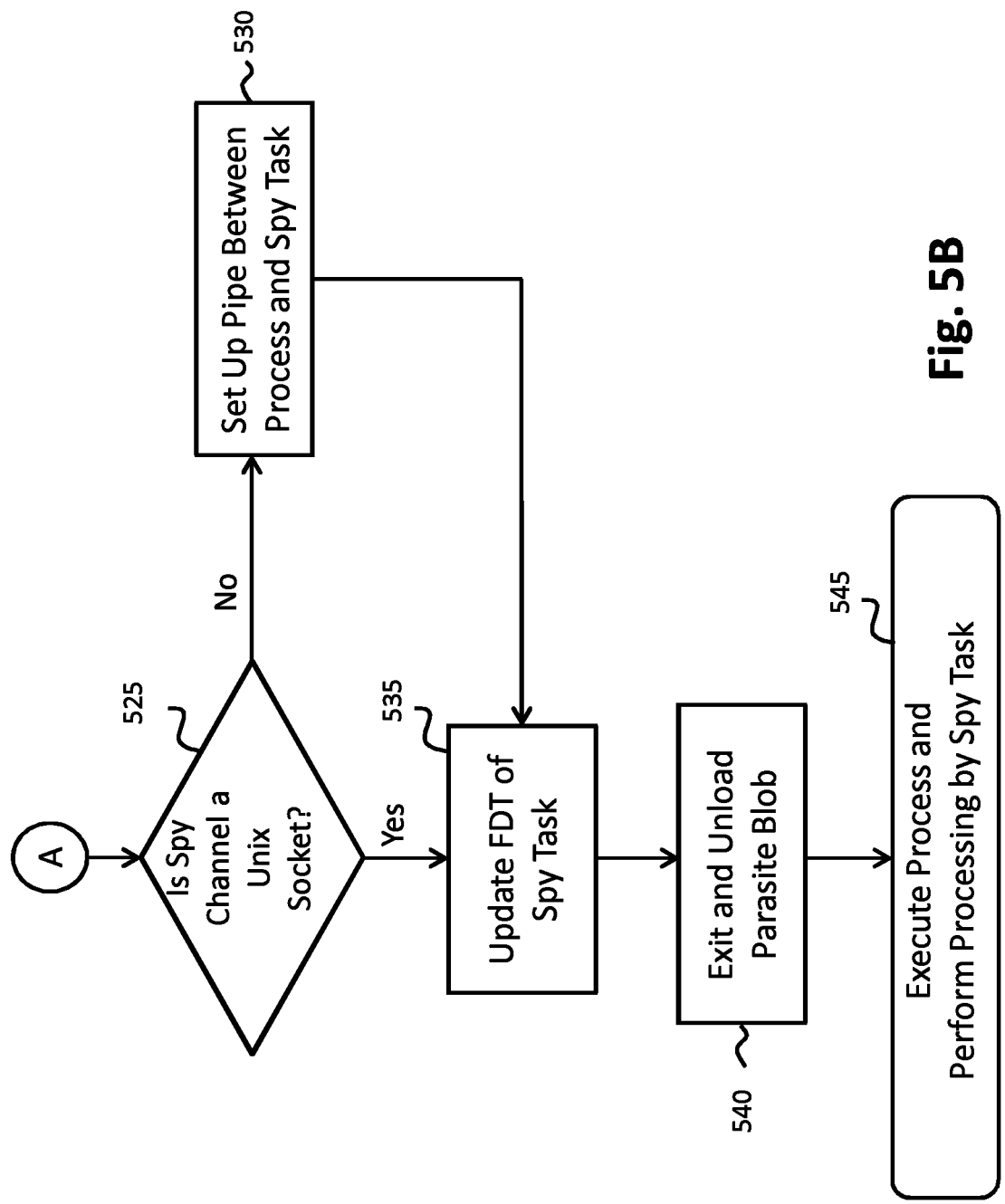

FIGS. 5A-5B illustrates a flowchart for a method for intercepting and controlling data traffic between a computer process and a file descriptor according to an exemplary aspect. In general, it should be appreciated that the components described above are provided as examples of the software and hardware components configured to perform the exemplary steps of the method. This description is provided as an exemplary illustration of this aspect. As shown, initially at step 505, the spy task 132 is configured to stop the execution of a process 120 on a computer device 110 using a debugging API 140, for example. The process 120 can be considered a first or primary process or task according to an exemplary aspect. Next, at step 510, the spy task 132 loads a parasite (e.g., parasite software module 144) into the address space of the process 120. The spy task 132 can be considered a second or secondary process or task according to an exemplary aspect.

At step 515, a UNIX socket is then established as a communication channel between the process 120 and the spy task 132 as described above. Next, at step 520, the parasite (e.g., parasite software module 144) takes control of the process 120 and transfers control of a file (e.g., File X) to the spy task 132 (i.e., by sending opened file descriptor). This is done using the UNIX socket set up at step 515, for example.

As further shown in FIG. 5B, the process modification module 130 then determines whether the spy channel that will be used during actual processing will be a UNIX socket or if it needs to be a pipe. For example, in one aspect, the spy task is configured to select either a pipe or a UNIX socket or some other type of communication channel (i.e., file) based on the parameters of the computer system(s) involved in the process. If it is not a UNIX socket, the method proceeds to step 530 where a separate pipe is established between process 120 and spy task 132, for example. Otherwise, if the communication channel is to be a UNIX socket, the method proceeds directly to step 535. In other words, as described above, the system is optimized by using the same UNIX socket set up at step 515 as the communication channel between process 120 and spy task 132 during execution of process 120. In either case, at step 535, the file descriptor table 136 of the process modification module 130 is updated to reflect the reference number in the file descriptor table 136 referring to the File X. Once the file descriptor table 136 is updated and accurate, the parasite blob (e.g., parasite software module 144) stops and gets removed from the address space of the process 120. Finally, at step 545, execution of process 120 is continued (i.e., restored) and all applicable data traffic being written to and read from File X 114A is first processed by spy task 132. As a result, the disclosed method is able to add a level of processing to the data traffic by spy task 132 without restarting or recompiling the process 120 being executed by CPU 112 of computer device 110.

Other possible applications of the concepts discussed above include some of the following:

The parasite code can implement clone( ), which can create a thread having access to a particular object (typically a fairly complex object), such as a main process VM, a File Descriptor Table, a File System, a Network Stack, network components, local and network drives, etc. The new thread can then Check Socket FDs to Get Stuck/Closed by Polling them A binary (parasite code) is written that, when loaded into a process, collects a list of its open sockets, finds TCP sockets among them, and starts a separate thread within the given process. The new thread starts monitoring the states and activities of these sockets. An ordinary threat, which interacts with sockets, reads and writes data there, sometimes in a non-blocking mode. The new thread will send notifications or warning if sockets have no data for too long. In case the main process cannot do this, this functionality can be added on the fly, i.e., provide any program with an ability to report that its socket connection is frozen.

Apply "Logrotate" on the Fly

If a process runs a log file, at some point this log file may become too large. To solve this problem, some processes or daemons may be programmed to start a new log file from scratch, prompted by a sighub signal. The logrotate utility puts the log file that has become too large aside, creates a new empty log file, and then sends a sighub signal to the daemon to reopen the file (by its name) and write there. However, not all daemons are capable of this. Nevertheless, a daemon can be "taught" to do this, without recompiling, by means of COMPEL. A binary will be loaded into the daemon, closing the log and reopening it at the sighub signal, i.e., performing logrotate.

Garbage Collector

A binary is loaded into a specific process (i.e., the binary knows where it is being loaded) and, based on some criteria, starts looking for memory leaks, releasing memory. For example: if the process allocates memory by an ordinary glibs alloc, then it has structures that allow to understand, where the leak is. A more complex example in a core is as follows: the entire address space is scanned (with a step that equals the pointer length—four or eight bytes, depending on architecture) to see which memory locations don't have pointers, i.e., absence of a pointer means that there is likely a memory leak. The same can be done with processes.

Another application of the garbage collection as described here is to the malloc/free heap.

Catch SIGSEGV, do Something with Mappings and Act Upon "Illegal" Memory Access

JAVA machine uses two memory blocks: a program to be executed is loaded into the first block, and byte code resulting from compiling the program is written into the second block. Not everything is compiled at once, but only as the need arises. The entire memory block containing the byte code is protected from reading. When the JAVA machine jumps into some part of the byte code that is protected from reading, a sigsegv signal is generated, notifying that a memory access error has occurred. JAVA intercepts this notification, understands which piece of the code has to be compiled, compiles it, writes the byte code, allows reading/execution, and continues its operation. With the proposed concept, this is possible to do with an arbitrary process.

Remote Swap for Task

The parasite code takes a process, loads a binary into it, which will find a memory location and wipe all data conforming to specific features from it, either by discarding them, transmitting them over the network, or packing them into a file. The memory location itself will be closed for reading. If a daemon or a process tries to access this location, a necessary piece that would have been accessed will be retrieved from the storage. This is a way to control memory in an application. In case it starts to occupy too much space, the excess data can be discarded, leaving the application only with what is really needed, while the rest is uploaded to a disk (or any other convenient place) or transmitted over the network, e.g., in a remote swap, which the core itself is unable to do.

WSS (Working Set Size) Detection

Again with the example of the JAVA machine, the entire memory may be taken away. Then, within some limited time, e.g., 5 minutes, it is measured to detect what sectors it demands to be returned. Thus, the working set of a given application can be understood.

Death Detection.

This is done by opening a pipe/socket and passing the other end outside. Once the "victim" dies, the pipe/socket will wake up. Daemon processes are children processes of 'ink' in LINUX. If a daemon dies, the following actions depend on the system. In some systems, there is a special process that checks periodically whether the daemons are alive, restarting them if needed. Currently, in LINUX, this special process is a system process. There is another method: a binary is loaded into the daemon opening a pipe and passing an end to the initiator process. Once the daemon dies, the pipe closes, thus notifying the initiator process.

Binary Updates.

This applies to live patching or libs relink. The live patching technology can be used for the core, when a system needs to be updated with a new core. Instead of restarting the system, the core undergoes binary changes to obtain a new core. With Compel, the same can be done with processes, i.e., applying binary changes to processes on the fly.

Tunneling—Replace Opened Socket with UNIX One, and Send the Former One to the Caller Given that there is a process with sockets, the sockets are replaced with pipes that look into a different process, which get an original connection. In LINUX, files can be transferred between processes, i.e., a socket is taken and passed over to the second process, and therefore, all traffic, which used to be sent into the network, is now directed through the second process. This allows to do the following:

Inject Socket Spy

The second process will be reading (analyzing) all the traffic generated by the first process, catching specified keywords or tags and performing specified actions.

Pack/Unpack

Packs traffic. If two services exchange traffic, and the amount of data is too large, a pair of packers can be injected between the services on the fly.

Crypt/Decrypt

Encrypts an unsecured channel without restarting its original processes.

Traffic Analyzer=Inject Socket Spy

Traffic Fanout (Multiplex)

For instance, the process is communicating over the network. All sockets taken from it, another process can be started to communicate in the first one's stead. The second process is also capable of analyzing the traffic and forward it not back to the first process, but to a third one, which will process some messages in the first process's stead (if the protocol allows it to). In other words, exclusive ownership over a network channel can be taken from the process.

Files on Disks—Proxy Via Pipe(s)

Filter/Split Logs

The same approach can be used not for sockets, but for files on a disk. COMPEL may do not just logrotate, but, when writing into logfile, replace file with pipe via a different process, so that the other process is able to read the messages, which are entered into the log, and analyze them. For example, it takes a long time to scan the log for warnings, whereas, in this way, the process will immediately respond to warnings, sending corresponding signals.

Do "Nohup" on the Fly

If a user accessed the server via a remote session and started a process there, then, as soon as the session (terminal) is closed, the process will be killed. In order to avoid this, the nohup command has to be used in LINUX, so that the following command is excluded from the current session and, therefore, is not killed, even if the session is closed. The parasite code is capable to execute nohup on the fly, by loading a binary into the process. This function may be useful for admins.

Debug Stuff by MSG_PEEK-Ing Sockets Messages of Tee+Splice Sockets

This is an example of an advanced debug. Sometimes, a daemon, which has been communicating over the network, freezes for some unknown reason. There are unread data in its connections, with which the daemon, apparently, needs to do something, but they can't be read (as LINUX has no such tools). So, a binary (parasite code) can be loaded to copy this data without removing them from the queue.

Re-Connect Sleeping Sockets to Other Addresses (not 100% Safe)

A similar idea can be used for network daemons. If a daemon is communicating with someone, its current connection is noticed to be invalid, a binary can be loaded to the daemon to close this connection and open a new one, e.g., with a different address, while the server will continue working on the new connection.

"Soft" Restart of a Service—Call Execve( ) from its Context

In order to restart a process, it usually has to be killed before restarting. However, this can be done without killing—by loading a binary parasite code that will make a system execve( ) call, which will restart a new executable file and remove the old one, without interrupting the process. Execve( ) takes a process, discards the old context and loads a new program into it. Open connections and files may be either closed before launching execve( ), or kept, depending the newly launched binary will treat them, i.e., whether it will look for open connections or files and interact with them, or not.

Force Entry into Container (Except Possibly PID Namespace)

Currently, LINUX has a system call that the process may put into a mainstream container, i.e., the process may enter the container (with some reservations), if it wants to. However, with COMPEL, the process may be forced to enter the container, if needed.

Re-Open all Files (and Cwd, Root) to Facilitate Moving to New (e.g., for Disk Replacement)

Active processes operate with some files from the disk. If there are any problems with the disk, the admin may wish to replace the disk. Currently, the only way it to kill all processes and turn off the computer, or, if the disk is a hotplug one, turn the disk off, unmount it, unplug it, etc. With COMPEL, this can be done on the fly, i.e., freezing the process, closing all the files it has opened, and telling the admin that they are free to make the necessary changes. The admin replaces the disk, plugs in a new one, mounts it from scratch, and then informs the binary that the work is complete. Then, the binary re-opens the files. Essentially, the process is removed from the disk, without killing the process.

Force Reparent (PID Change)

Re-Open all Files—Force Daemonize

Forced daemonizing of a process. Daemons are launched as follows: a command interpreter sends a command to launch a daemon, wherein the command interpreter creates a child process, which, in turn, creates its own child process, which launches the command that needs to be daemonized, whereas the intermediate child process (the interpreter's child) collapses. Then, LINUX takes the parentless process (the interpreter's "grandchild") and passes it over to 'ink', thus daemonizing it. If, for some reason, the process doesn't start as a daemon and doesn't become the init's child, the operator may open this process, fork it and collapse the parent, thus daemonizing the child. However, this method is unsafe, as it causes the process ID to be changed.

Figure 6:
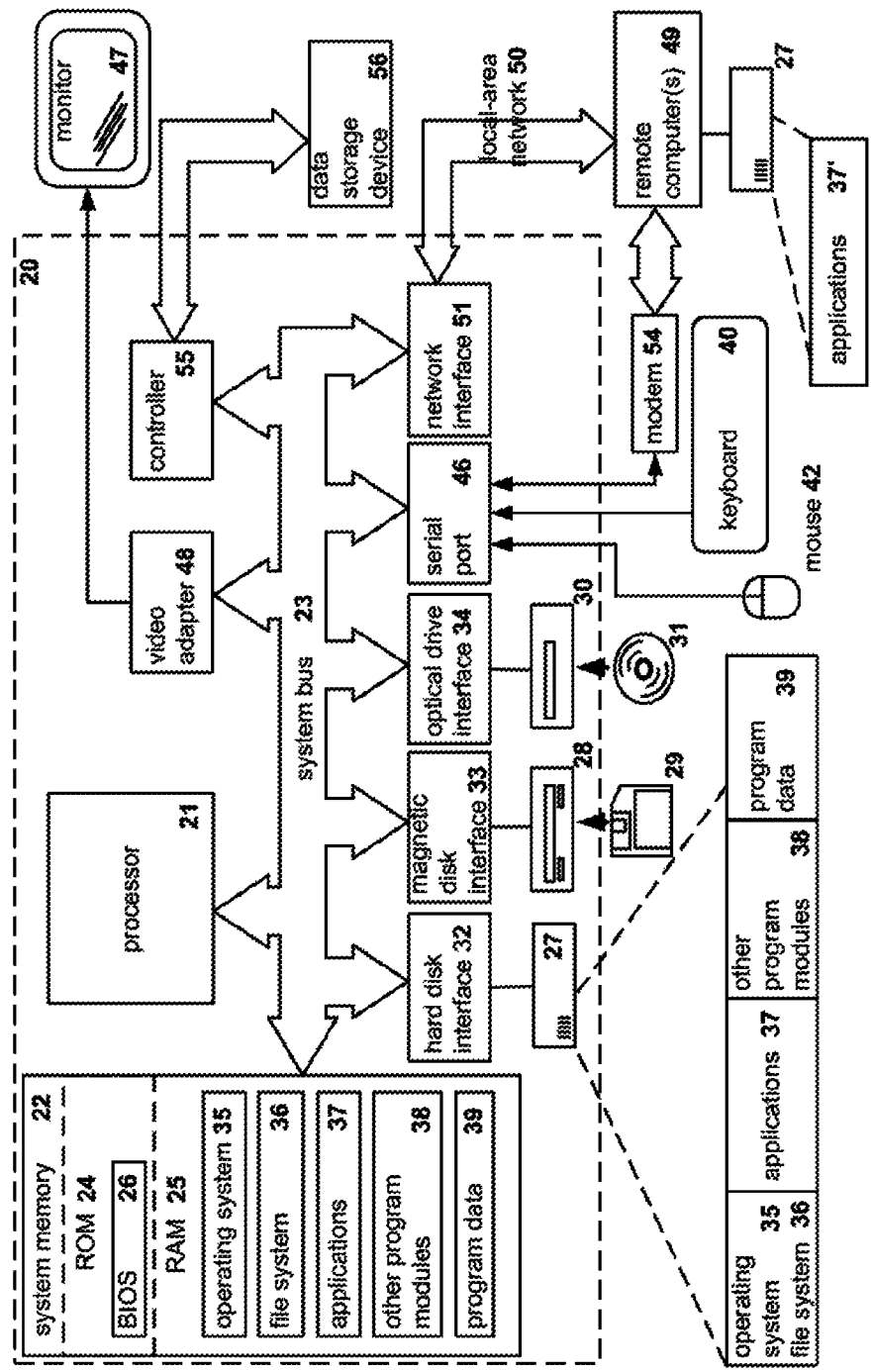
FIG. 6 illustrates an example of a general-purpose computer system (which may be a personal computer or a server) on which the disclosed systems and method can be implemented according to an example aspect.

FIG. 6 illustrates an example of a general-purpose computer system (which may be a personal computer or a server) on which the disclosed systems and method can be implemented according to an example aspect. It should be appreciated that the detailed general-purpose computer system can correspond to computer device 110 and/or a separate computing system or server configured to executed the process modification module 130 and perform the above-described algorithm according to an exemplary aspect.

As shown, the computer system 20 includes a central processing unit 21, a system memory 22 and a system bus 23 connecting the various system components, including the memory associated with the central processing unit 21. For example, the central processing unit 21 can correspond to the CPU 112 and the system memory 22 can correspond to memory of computer device 110 as described above. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides an exemplary implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as BLUETOOTH.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for redirecting input/output, the method comprising:
    on a CPU, interrupting an execution of a first process with a first object descriptor table associated with the first process, the first object descriptor table including a reference for the first process to a first system resource;
    loading parasite code into memory, wherein the parasite code provides access to a second system resource under control of a second process;
    the second process forcing a switch of execution from the first process to the parasite code, and replacing in the first object descriptor table the reference for the first process to the system resource by a reference to the second system resource, thereby causing the input/output to go through the second system resource instead of the first system resource; and
    restoring the execution of the first process after the execution of the parasite code is complete.

2. The method according to claim 1, wherein the second system resource is a communication channel.

3. The method according to claim 1, wherein the second system resource is a socket.

4. The method according to claim 1, wherein the second system resource is a file on a disk.

5. The method according to claim 1, wherein the second system resource is a virtual file in the memory.

6. The method according to claim 1, wherein the second system resource is a file system.

7. The method according to claim 1, wherein the second system resource is a network card.

8. The method according to claim 1, wherein the second system resource is a pipe.

9. The method according to claim 1, wherein the second system resource is a timer.

10. The method according to claim 1, wherein the second system resource is a disk or a partition.

11. The method according to claim 1, wherein code of the first process is not modified by the loading of the parasite code into the memory.

12. The method according to claim 1, wherein the first object descriptor table is a file descriptor table.

13. The method according to claim 1, wherein the parasite code is inserted into an address space of the first process in the memory by the second process.

14. The method according to claim 1, wherein the parasite code performs a logrotate on the fly.

15. The method according to claim 1, wherein the parasite code performs checks on socket file descriptors to verify if a connection of the second process is frozen.

16. The method according to claim 1, wherein the parasite code performs garbage collection.

17. The method according to claim 1, wherein the parasite code intercepts SIGSEGV and acts upon an illegal memory access.

18. The method according to claim 1, wherein the parasite code performs a remote swap for a task.

19. The method according to claim 1, wherein the parasite code performs WSS (Working Set Size) detection.

20. The method according to claim 1, wherein the parasite code performs death detection of a process that is unrelated to the first or second processes.

21. The method according to claim 1, wherein the parasite code performs a binary update for live patching or libraries relink.

22. The method according to claim 1, wherein the parasite code performs tunneling to replace an opened non-UNIX socket with a UNIX socket.

23. The method according to claim 1, wherein the parasite code injects a socket spy.

24. The method according to claim 1, wherein the parasite code performs a crypt and/or decrypt of an unsecured channel without restarting its original processes.

25. The method according to claim 1, wherein the parasite code performs a traffic fanout (multiplex).

26. The method according to claim 1, wherein the parasite code performs a filter and/or split log for a file on disks using a proxy via a pipe.

27. The method according to claim 1, wherein the parasite code performs a nohup on the fly.

28. The method according to claim 1, wherein the parasite code retrieves unread data for a frozen daemon.

29. The method according to claim 1, wherein the parasite code performs a re-connect for sleeping sockets to other addresses.

30. The method according to claim 1, wherein the parasite code performs "soft" restart of a service by calling execve( ) from a context of the service.

31. The method according to claim 1, wherein the parasite code forces entry into a Container.

32. The method according to claim 1, wherein the parasite code forces a reparent for a process.

33. The method according to claim 1, further comprising updating a second object descriptor table for the second process so that the second object descriptor table includes a first reference to the first system resource and a second reference to the second system resource.

34. A system for redirecting input/output, the system comprising:
- a CPU and a memory coupled to the CPU, the memory containing computer code implementing
- a first process with a first object descriptor table associated with the first process, the first object descriptor table including a reference for the first process to a first system resource;
- a second process that loads a parasite code into the memory, wherein the parasite code provides access to a second system resource under control of the second process;
- the second process forcing a switch of execution from the first process to the parasite code, and replacing in the first object descriptor table the reference for the first process to the system resource by a reference to the second system resource, thereby causing the input/output to go through the second system resource instead of the first system resource; and
- the second process restoring the execution of the first process after the execution of the parasite code is complete.

* * * * *